United States Patent [19]
Olson

[11] Patent Number: 4,996,946
[45] Date of Patent: Mar. 5, 1991

[54] PORTABLE ARTICLE OF RUBBING FURNITURE FOR CATS

[76] Inventor: Jerome C. Olson, 745 S. Bernardo Ave., #351-D, Sunnyvale, Calif. 94087

[21] Appl. No.: 350,294

[22] Filed: May 9, 1989

[51] Int. Cl.$^5$ .............................................. A01K 29/00
[52] U.S. Cl. ..................................... 119/29; D30/199
[58] Field of Search ............... 119/29, 1, 83, 85, 29.5, 119/157; D30/158, 159, 160, 199; 446/497, 482; 297/44

[56] References Cited

U.S. PATENT DOCUMENTS

| | | | |
|---|---|---|---|
| D. 255,610 | 6/1980 | Clarke-Fodor | 119/29 X |
| 2,005,817 | 6/1935 | Yoder | 119/29 X |
| 2,894,487 | 7/1959 | Goldson | 119/1 |
| 2,997,019 | 8/1961 | Bryson | 119/29 X |
| 3,581,707 | 6/1971 | Cook | 119/1 |
| 4,177,763 | 12/1979 | Cook | 119/29 |
| 4,302,048 | 11/1981 | Yount | 297/440 |
| 4,517,922 | 5/1985 | Lind | 119/29 |
| 4,577,590 | 3/1986 | Skroch | 119/29 |
| 4,747,371 | 5/1988 | Leopold | 119/83 |
| 4,807,569 | 2/1989 | Leopold | 119/83 |

FOREIGN PATENT DOCUMENTS

2427784  2/1980  France .................................. 119/29

OTHER PUBLICATIONS

"Solo", Pedigrees Catalog, Sep. 15, 1987, p. 11.
Cat-A-Comb, Parade, Jul. 26, 1987.

Primary Examiner—Robert P. Swiatek
Assistant Examiner—Todd E. Manahan
Attorney, Agent, or Firm—John J. Leavitt

[57] ABSTRACT

Presented is an article of furniture constituting a portable rubbing pedestal for cats. The portable rubbing pedestal includes a generally flat base member which extends an upwardly reaching pedestal. The base includes a platform on which is detachably secured a covering into which a cat can sink its claws. The upwardly reaching pedestal provides a flat surface on which is detachably secured a covering into which a cat can sink its claws, and a second surface that is undulated vertically from the base member and is ribbed or corrugated to provide an uneven surface against which a cat can rub its body to provide a self-administered message.

7 Claims, 1 Drawing Sheet

U.S. Patent
Mar. 5, 1991
4,996,946
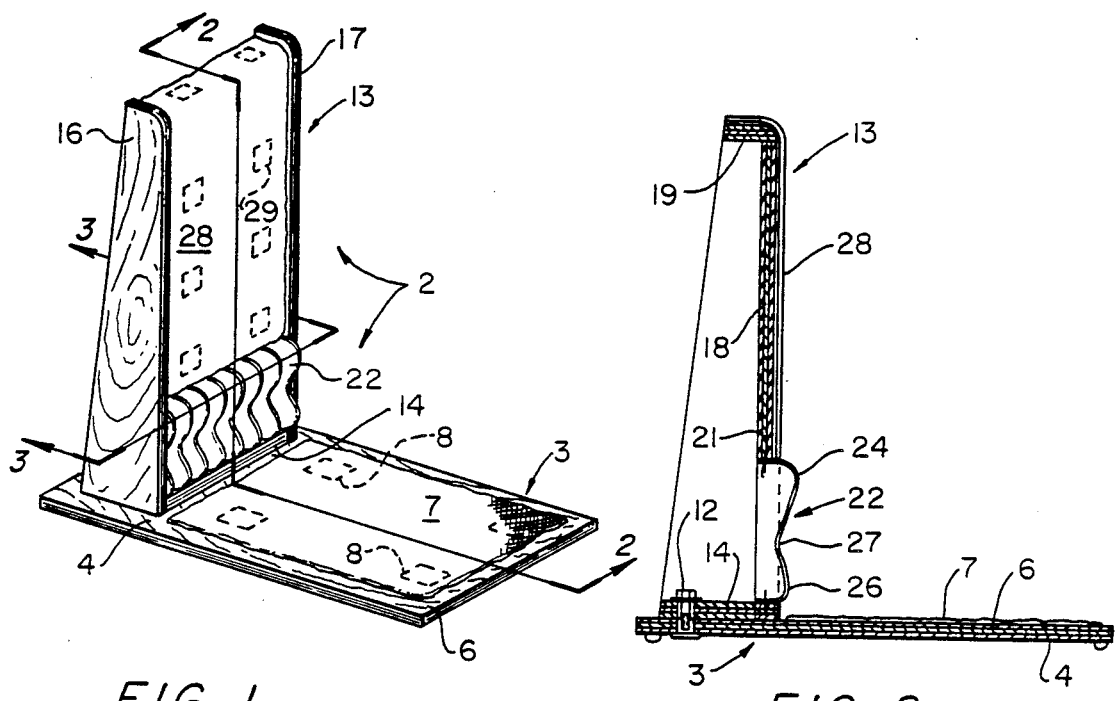
FIG. 1
FIG. 2
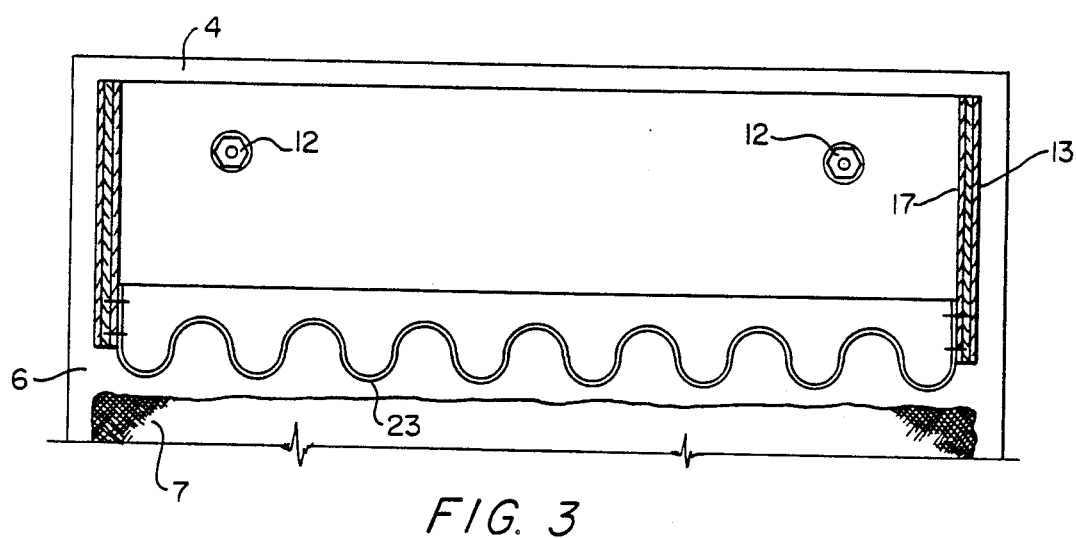
FIG. 3
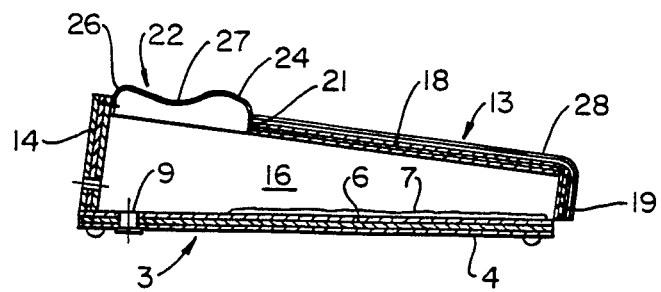
FIG. 4

PORTABLE ARTICLE OF RUBBING FURNITURE FOR CATS

BACKGROUND OF THE INVENTION

1. Field of the Invention

This invention relates to comfort stations for house cats, and particularly to an article of furniture for the home where a house cat can rub its fur and stretch its nails.

2. Description of the Prior Art

It is well known that house cats seem to have the need to occasionally stretch their nails. Cats have been known to rip drapes and the upholstery on furniture to shreds in an attempt to satisfy this need. Cat owners who are aware of this need sometimes provide a post wrapped with a carpet material to provide the cat of the house with an alternative site where it can "stretch" its nails without damage to the drapes or upholstered furniture. Accordingly, it is an object of the present invention to provide an article of furniture specifically designed for use by a house cat in order to satisfy its need to "scratch" or "stretch" its nails.

The instinct to scratch or stretch its nails is not the only instinct possessed by a house cat. Another is the apparent need to rub its body on anything or anybody that is available. Cats will rub the sides of their bodies on furniture or on a person's pantlegs, or on a table leg or any other object that is available. It is not known why cats indulge in this rubbing ritual, but it is presumed that in some way it is akin to being stroked by a human hand. Cats have been observed to purr with contentment when engaged in this ritual in the same way that they purr with contentment when held in the arms and stroked. Accordingly, it is another object of the invention to provide a portable article of furniture that provides a ribbed surface not unlike the fingers of the human hand and against which a house cat may rub its body to receive a self-administered massage by stroking its body against the ribbed surface.

Another object of the invention is the provision of a portable pedestal for a house cat that is designed to fit in with the decor of the room in which it is placed, be that a luxurious living room or a rustic family room.

Still another object of the invention is the provision of a portable pedestal for house cats that may be assembled and disassembled quickly and easily for shipping in a knocked-down condition or for storage.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the portable article of rubbing furniture for house cats comprises a base member adapted to be supported on a floor, and over a portion of the top surface of the base member a covering such as a remnant of a carpet may be detachably secured to the base to permit its removal and replacement when soiled. Also mounted on the top surface of the base member is an upwardly extending pedestal having flat front and rear surface portions at least one of which has a carpet remnant mounted thereon. The pedestal is of sufficient height that a cat can place the claws of its rear paws on the base and the claws of its front paws on the top of the pedestal and stretch its body. On the front face of the pedestal adjacent the base member, there is provided an area having parallel ribs or corrugations formed with an undulating or scalloped front surface, thus providing an irregular surface against which the cat can press and rub its body while standing on the base member. Means are provided for detachably connecting the upwardly extending pedestal portion to the horizontal base member.

BRIEF DESCRIPTION OF THE DRAWINGS

FIG. 1 is a perspective view of the portable rubbing pedestal of the invention shown in assembled form.

FIG. 2 is a vertical cross-sectional view of the portable pedestal taken in the plane indicated by the line 2—2 in FIG. 1.

FIG. 3 is a vertical cross-sectional view taken in the plane indicated by the line 3—3 in FIG. 1 and shown enlarged.

FIG. 4 is vertical cross-sectional view of the portable pedestal shown in knocked-down condition.

DESCRIPTION OF THE PREFERRED EMBODIMENT

In terms of greater detail, the portable rubbing pedestal for cats that forms the subject matter of this invention is designated generally by the numeral 2, and includes a base member designated generally by the numeral 3, which comprises a generally flat elongated substantially rectangular flat platform 4 conveniently formed from wood and having first and second end portions. Other materials may of course be utilized instead of wood.

Detachably secured to the upper surface 6 of the base platform is a covering member 7. I have found that a carpet remnant cut to fit a major portion of the top surface of the platform, as illustrated, serves the purpose of providing a soft cushion on which a cat may lie, and also provides a surface into which a cat can sink its claws if it feels like stretching or clawing. Preferably, the covering material is detachably secured to the top surface of the platform by suitable means 8 fastened to the underside of the covering and the top surface of the platform. I have found that four small squares of a felt material fastened to the underside of the covering, cooperating with complementary squares of a "hook" type material which detachably engages the felt material, forms a convenient means for detachably attaching the covering to the platform. Such a material is available commercially under the trademark VELCRO.

As illustrated in FIGS. 1 and 2, the covering 7 does not encompass the entire upper surface of the platform. A portion of the platform adjacent a first end is devoid of covering and is provided with at least two spaced apertures 9 through which may extend a pair of removable fastening devices 12, such as a pair of nut and bolt assemblies as shown.

The removable fastening devices serve to detachably mount an upwardly extending pedestal, designated generally by the numeral 13. The pedestal is provided with a base 14, apertured to receive the fastening devices 12, and is adapted to lie flat on the top surface of the platform adjacent the first end devoid of covering material as shown. From adjacent opposite side edges of the base 14, which may also be conveniently formed from wood, there rises a pair of laterally spaced side rails 16 and 17 to a height substantially equal to or somewhat greater than the length of the platform 3. Between the rails, and appropriately secured therebetween, is a flat plate 18, also conveniently formed from wood, the side edges of which abut against and are secured to the side rails. At its upper end, the flat plate 18 may be joined by a rearwardly extending flange portion 19 to conform the top of the pedestal to the configuration of the top of the side rails as shown.

The lower edge 21 of the flat plate 18 may be terminated at a point spaced from the base 14 to provide space for the attachment of a ribbed rubbing member, designated generally by the numeral 22. The upper edge of the ribbed rubbing member may be fastened, as illustrated, to the lower edge of the flat plate 18 by any suitable means, such as staples, while the lower end of the ribbed rubbing member may be similarly fastened to the base 14, as shown. The ribbed rubbing member thus fills the gap between the lower end 21 of the flat plate 18 and the base 14, and provides a surface having vertically extending ribs or corrugations 23 which undulate to provide an outwardly projecting portion 24 adjacent the upper end of the ribbed or corrugated rubbing member, and an outwardly projecting portion 26 adjacent the bottom end of the rubbing member. Between these two extremes, the surface of the ribbed or corrugated rubbing member is recessed as shown at 27. There is thus provided a gently curved or undulating surface having corrugations or ribs against which a cat may rub its body in a self-administered massage that is comforting to the cat. I have found that the rubbing member may be conveniently formed from plastic by a vacuum forming process.

To enhance the attraction of the portable rubbing pedestal to cats, the front face of the flat plate 18 above the rubbing member is covered with a covering 28 similar to the covering 7 on the platform. I have found that a carpet remnant performs satisfactorily, providing a surface into which the cat may sink its claws, so that the cat can "scratch" or stretch its claws and its body. The covering 28 is detachably fastened to the flat plate 18 by fastening means 29 similar to the "hook" and felt fastening means 8 used to detachably secure the covering 7 to the platform 3.

While I have disclosed and described what I believe to be the preferred form of the invention, it is obvious that the invention may be embodied in different forms within the scope of the appended claims. For instance, the flat plate 18 may extend to and be fastened to the base 14, and the rubbing member may be attached to the face of the flat plate. Additionally, the rear side of the flat plate 18 may also be covered with a carpet remnant, or other type covering.

Having thus described the invention, what is believed to be new and novel and sought to be protected by Letters Patent of the United States is as follows.

I claim:

1. A portable article of rubbing furniture for cats, comprising:
   (a) a base member including a platform having an upper surface adapted to provide access thereto to a cat; and
   (b) a pedestal detachably secured to the upper surface of the platform and including a first surface portion into which a cat may sink its claws and a second surface portion into which a cat cannot sink its claws but against which a cat may rub its body whereby to provide a self administered massage;
   (c) said second surface portion of said pedestal into which a cat cannot sink its claws comprising a vertically undulating corregated surface.

2. The portable article of rubbing furniture according to claim 1, in which said pedestal extends upwardly from said base and includes a pair of laterally spaced side rails and a flat plate disposed between said rails and including said first surface portion.

3. The portable article of rubbing furniture for cats according to claim 1, in which the upper surface of the platform is provided with a covering into which a cat may sink its claws.

4. The portable article of rubbing furniture for cats according to claim 3, in which said covering comprises a layer of textile material.

5. The portable article of furniture for cats according to claim 4, in which said textile covering is detachably secured to said platform.

6. The portable article of rubbing furniture for cats according to claim 1, in which the first surface portion of the pedestal into which a cat can sink its claws comprises a layer of textile material.

7. The portable article of rubbing furniture for cats according to claim 6, in which said textile covering is detachably secured to said pedestal.

* * * * *